United States Patent [19]

Stout et al.

[11] Patent Number: 5,297,514
[45] Date of Patent: Mar. 29, 1994

[54] SAFETY LOCK FOR AN ADJUSTABLE PET COLLAR

[75] Inventors: James G. Stout; Kenneth J. Baker; Brian D. Oyster, all of Alliance, Ohio

[73] Assignee: Coastal Pet Products, Inc., Alliance, Ohio

[21] Appl. No.: 44,799

[22] Filed: Apr. 12, 1993

[51] Int. Cl.⁵ .............................................. A01K 27/00
[52] U.S. Cl. .................................................. 119/863
[58] Field of Search ................... 119/106, 109; 24/200

[56] References Cited

U.S. PATENT DOCUMENTS

| | | | |
|---|---|---|---|
| 534,380 | 2/1895 | Smith | 119/106 |
| 3,064,271 | 11/1962 | Kuber | 24/200 |
| 3,678,541 | 7/1972 | Lefkowitz | 24/200 |
| 4,321,891 | 3/1982 | Moeller | 119/106 |
| 4,765,279 | 8/1988 | Klickstein | 119/109 |

OTHER PUBLICATIONS

"Safari by Whitco" (4 sheets), Whitco Manufacturing Inc., 2501 Middle Country Road, Centereach, New York 11720; undated.
T. E. Scott, Inc., 10421 Rockville Road, Indianapolis, Ind. 46234 (2 sheets); Mar. 1990.
Mustang Products, Inc., P.O. Box 338, Damascus, Ohio 44619 (4 sheets); undated.
Hamilton Products, 5500 Southwest Sixth Place, Ocala, Florida 32674 (5 sheets); undated.
Aspen Pet Products, 306 Unit-B, Aspen Airport Business Center, Aspen, Colorado 81611 (1 sheet); 1990.
"General Hardware Catalog", Custom Metal Crafters, Inc. (2 sheets); 1989.
Batz Corp., 5 Portea Drive, P.O. Box 6067, Pine Bluff, Ark. 71611 (2 sheets); 1991.
Royalox International Inc., 81 Howard St., Phillipsburg, N.J. 08865 (2 sheets); 1992.
ITW Nexus, an Illinois Tool Works Company, 230 W. Gerry Drive, Wood Dale, Ill. 60191 (4 sheets); undated.
Allens Mfg. Co., Inc., Providence, Rhode Island (5 sheets); undated.
"CC Buckles"; CC Metal Products, 456 Nordhoff Place, Englewood, New Jersey 07631 (14 sheets); Oct. 1990.
Coastal Pet Products, Inc., 46 North Rockhill Ave., Alliance, Ohio 44601 (2 sheets); 1992.

Primary Examiner—Gene Mancene
Assistant Examiner—Thomas Price
Attorney, Agent, or Firm—Renner, Kenner, Greive, Bobak, Taylor & Weber

[57] ABSTRACT

A pet collar (10) includes a first web portion (18) attached to a second web portion (19) by a locking device (16). The locking device (16) includes opposed plates (22, 23) each of which have a plurality of apertures (27, 28, 29) therein which receive the web portions (18, 19). A lock barb (26) is positioned at each end of each plate (22, 23) and the lock barbs (26) of opposed plates (22, 23) are opposed to each other so that when tension is placed upon a web portion (18, 19), the opposed lock barbs (26) will engage the web portion (18, 19) positioned therebetween.

14 Claims, 2 Drawing Sheets

SAFETY LOCK FOR AN ADJUSTABLE PET COLLAR

TECHNICAL FIELD

This invention relates to collars for pets such as dogs, cats and the like which may be adjusted in size. More particularly, this invention relates to such a collar which is provided with a safety lock device so that the pet cannot be accidentally choked when tension is placed on the collar.

BACKGROUND ART

Pet collars which can be adjusted in size are known in the art and, in fact, are quite popular in that the pet owner need not be aware of the exact size of the neck of the pet when purchasing a collar. Thus, the owner can merely adjust the size of the collar at home when first putting it on the pet. Moreover, such collars are ideal for younger pets in that they may be adjusted in size as the pet grows.

Most adjustable collars are provided with a loop and a slide such that as the slide is moved along the web of the collar, its size or length is adjusted. While such adjustment is a simple process for the pet owner, the collar itself can be a hazard to the pet. For example, the loop utilized for adjustment can quite often get caught on various items such as tree limbs, fences, or the leg of the pet itself or that of another animal. Upon such an occurrence, the natural tendency of the pet is to try to pull itself free which will pull out the loop which in turn tightens the collar on the pet's neck, potentially choking the pet.

Thus, while adjustable collars have many advantages, the need exists for such a collar which does not present a safety hazard to the pet.

DISCLOSURE OF THE INVENTION

It is thus a primary object of the present invention to provide an adjustable pet collar with a safety device so that the pet cannot be accidentally choked by the collar.

It is another object of the present invention to provide an adjustable collar, as above, in which the safety device is a locking member which grips the web of the collar upon tension being applied thereto so that the collar cannot be tightened.

It is a further object of the present invention to provide an adjustable collar, as above, in which the safety device will grip the web no matter which end of the web is placed in tension.

It is an additional object of the present invention to provide an adjustable collar, as above, wherein the greater the tension which may be applied to the web, the greater the gripping force of the safety device on the web.

These and other objects of the present invention, as well as the advantages over existing prior art forms, which will become apparent from the description to follow, are accomplished by the improvements hereinafter described and claimed.

In general, a pet collar made in accordance with the concepts of the present invention includes two web portions joined by a locking device. The locking device includes two plates each having lock barbs. The plates are also each provided with a plurality of apertures through which the web portions are threaded. The lock barbs of one plate are opposed to the lock barbs of the other plate so as to engage the web portions positioned therebetween when at least one of the web portions is put under tension.

A preferred exemplary adjustable pet collar incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
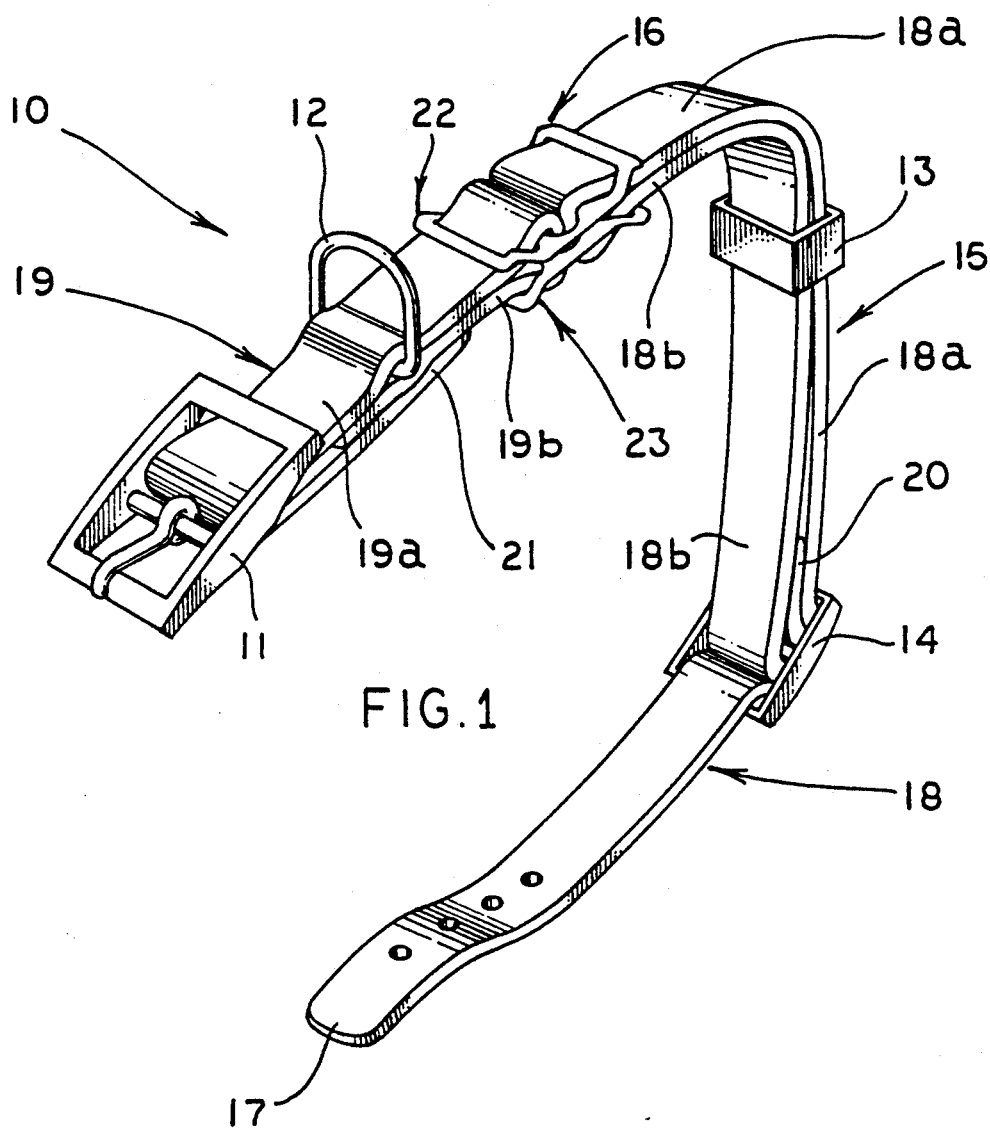
FIG. 1 is a perspective view of an adjustable collar made in accordance with the concepts of the present invention which includes the safety locking device.

An adjustable pet collar made in accordance with the concepts of the present invention is indicated generally by the numeral 10 in FIG. 1. Collar 10 includes a conventional buckle 11, a conventional D-ring 12 for attachment of collar 10 to a chain or leash, a conventional keeper member 13, a conventional adjustment slide bracket 14, a web member indicated generally by the numeral 15, and a safety locking device indicated generally by the numeral 16.

Web member 15 includes a free end 17 adapted to be conventionally engaged by buckle 11 to form the continuous collar 10, and is normally woven of some flexible material, such as nylon or the like, so as to be comfortable for the pet. Of course, web member 15 could be made of leather, extruded plastic, knitted fabric, or the like—with the material of web member 15 being unimportant to the present invention. In prior art adjustable collars, the web member was one continuous piece extending from the free end, through the adjustment slide, around the buckle, and back to and looped over the adjustment slide where it was stitched in place to itself. It was the loop formed thereby which presented the safety hazard to the pet.

In the present invention, web member 15 of collar 10 actually includes two separate web sections generally indicated by the numerals 18 and 19, each being formed of a continuous web of material and together forming collar 10. Thus, as shown, web section 18 begins at free end 17 and is conventionally threaded through the top of adjustment slide 14 to form an upper web member 18a. Upper web member 18a is threaded through locking device 16, in a manner to be hereinafter described, and thus turns back as lower web member 18b thereby forming a web loop engaged by locking device 16. Web member 18b is then threaded around adjustment slide 14 and stitched to itself, as at 20. Thus, web 18 starts at free end 17 and ends at adjustment slide 14 where lower web member 18b is stitched to itself. Web members 18a and 18b are generally held in juxtaposition by keeper 13, but it is the loop formed therebetween at the area of adjustment slide 14 which could result in a hazard to the pet were it not for safety locking device 16, as will hereinafter be described.

Web section 19 begins at end 21 and loops around buckle 11 in a conventional manner to form an upper web member 19a which is received through D-ring 12 and threaded through locking device 16 in a manner to be hereinafter described. Web member 19a turns back as a lower web member 19b thereby forming a web loop engaged by locking device 16. Web member 19b terminates under D-ring 12 between upper web member 19a and web end 21. Upper web member 19a, lower web member 19b and web end 21 are all stitched together, on each side of D-ring 12, which not only prohibits movement of D-ring 12 along web section 19, but also renders web section 19 as one continuous web of material.

Figure 3:
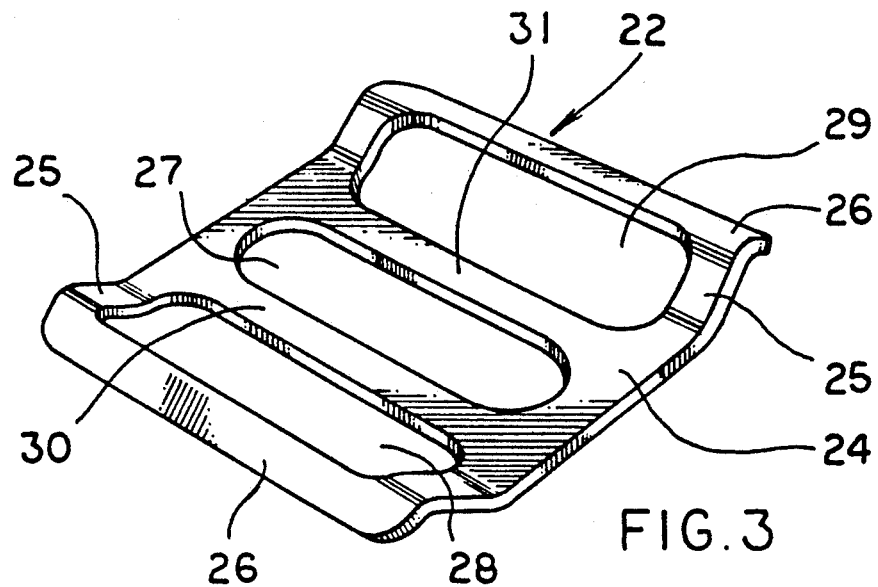
FIG. 3 is a perspective view of one of two identical locking plates which form the safety locking device.

Web sections 18 and 19 are thus joined by safety locking device 16 to form collar 10. Locking device 16 includes opposed upper and lower locking plates generally indicated by the numerals 22 and 23, respectively, which are identical in construction. Upper locking plate 22 is shown in FIG. 3 and will now be described in detail, it being understood that numerically identified components of plate 22 are the same in plate 23.

Thus, each plate 22, 23 includes a generally planar central section 24, each end of which terminates as upturned flanges 25 extending angularly away from central section 24. A downturned projection or lock barb 26 extends angularly downwardly from the apex of each flange 25, preferably at a downward angle of approximately 8° from horizontal. Each barb 26 is of a length such that it does not cross the plane of central section 24. A central aperture 27, preferably generally oval in configuration, is formed in central section 24 of each plate 22, 23 and preferably oval side apertures 28 and 29 are formed on each side of aperture 27. As shown, apertures 28 and 29 actually extend partially through the ends of central section 24 and partially through upturned flanges 25. Thus, the outer ends of apertures 28 and 29, adjacent to lock barbs 26, are on a higher plane than the inner ends adjacent to central aperture 27. A bar 30 is thus formed in central section 24 between side aperture 28 and central aperture 27 and a bar 31 is formed between side aperture 29 and central aperture 27.

Figure 2:
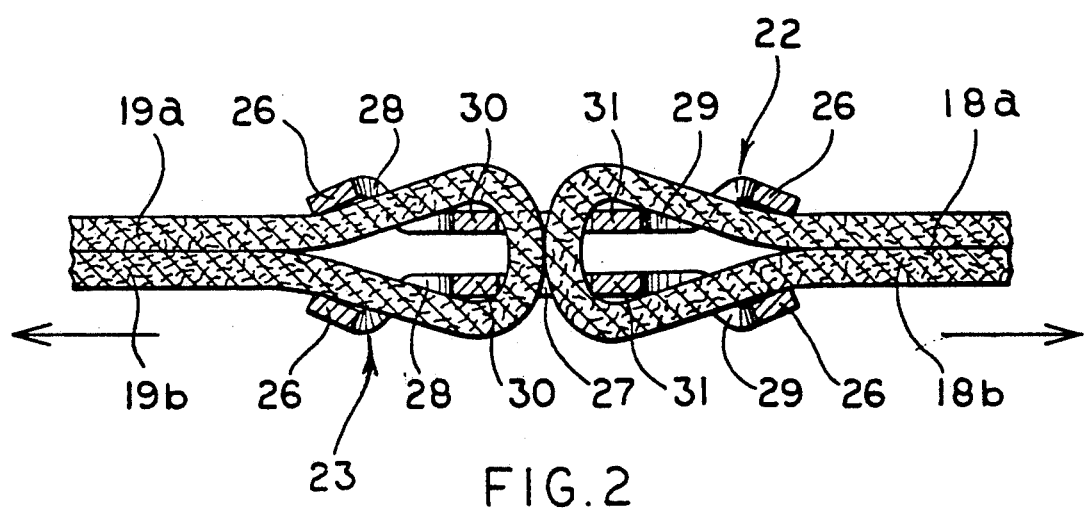
FIG. 2 is a sectional view taken through the lateral center of the safety locking device shown in FIG. 1.
Figure 4:
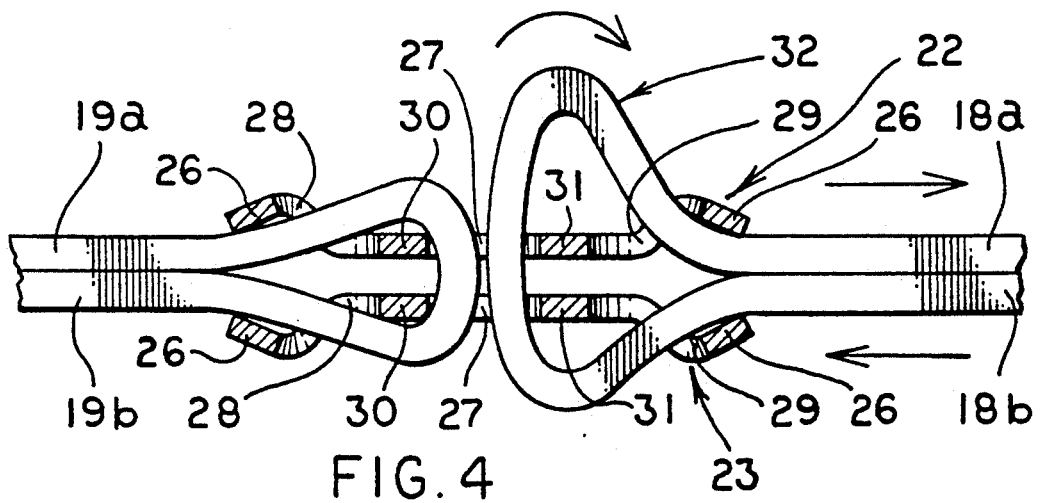
FIG. 4 is a view similar to FIG. 2 which somewhat schematically depicts the manner in which the web of the collar is manipulated relative to the safety locking device during adjustment of the size of the collar.
Figure 5:
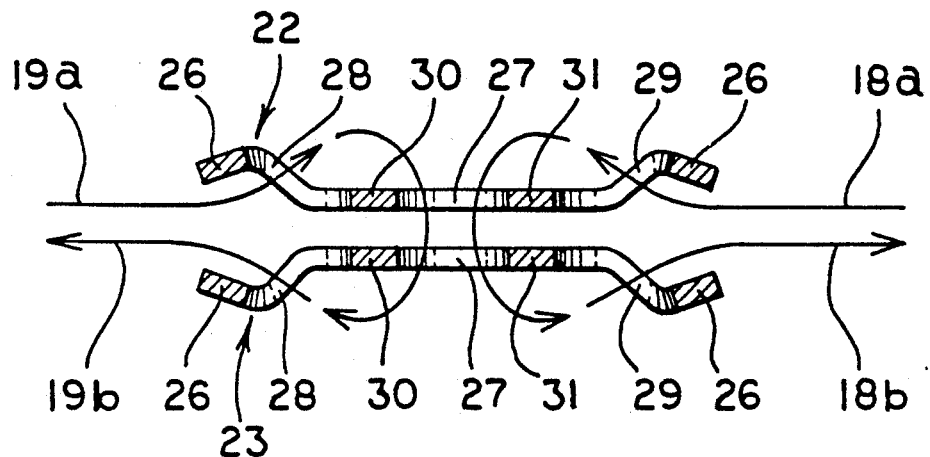
FIG. 5 is a somewhat schematic view of adjacent locking plates, as shown in FIGS. 2 and 4, depicting the manner in which the web of the collar is threaded into the locking device.

Locking device 16 is formed by positioning plates 22 and 23 adjacent to each other as best shown in FIGS. 2, 4 and 5. Plates 22 and 23 are positioned so that their lock barbs 26 are adjacent to or otherwise facing each other. Thus, downturned barbs 26 of upper plate 22 face and are adjacent to what in this position are upturned barbs 26 of lower plate 23. Likewise, central planar sections 24 are closely adjacent to each other, in fact, closer to each other than are barbs 26 since barbs 26 do not extend to the planes of sections 24.

The manner in which webs 18 and 19 are threaded through and thereby joined by locking device 16 is shown in FIG. 5. Web 18a is fed in between adjacent barbs 26, up through side aperture 29 of upper plate 22, around bar 31 of upper plate 22, and down through its central aperture 27 as well as the central aperture 27 of lower plate 23. Then, as now defined as lower web portion 18b, it goes around bar 31 of lower plate 23, up through side aperture 29 of lower plate 23 and out between barbs 26 thereby being adjacent to upper web 18a. Web 19 is threaded in an identical fashion. That is, web 19a is fed in between adjacent barbs 26, up through side aperture 28 of upper plate 22, around bar 30 of upper plate 22, and down through its central aperture 27 as well as the central aperture 27 of lower plate 23. Thus, the looped webs 18 and 19 are adjacent to each other within aperture 27. Then, lower web portion 19b is positioned around bar 30 of lower plate 23, up through side aperture 28 of lower plate 23 and out between barbs 26 thereby being adjacent to upper web 19a.

The manner in which locking device 16 will prohibit the sliding of webs 18 and 19 when placed under tension is shown in FIG. 2. If either or both of webs 18 and 19 are put under tension, as by a pulling in the direction of the arrows in FIG. 2, or for that matter if either component web 18a or 18b or 19a or 19b is singly put under tension, a downward force is put on either or both of bars 30 and 31 of upper plate 22 and an upward force is put on either or both of bars 30 and 31 of lower plate 23. This draws upper plate 22 and lower plate 23 closer together and opposed lock barbs 26 will engage webs 18 and 19 to restrict any movement or sliding thereof. The rounded corners of the oval apertures 27, 28 and 29 will also bend the web material pinching the same to further restrict the movement thereof. The more tension which is applied, the more force is applied by barbs 26 to engage webs 18 and 19. As previously described, because barbs 26 are of a length so as to stop short of the plane of center section 24 of each plate 22, 23, were their center sections 24 to be placed in abutment, there would still be a space between adjacent barbs 26. It is important that this space be less than the total fully compressed thickness of webs 18 and 19 so that center sections 24 of plates 22 and 23 do not touch. Otherwise, if under extreme tension, center sections 24 of plates 22 and 23 would touch each other, the holding effectiveness of the barbs 26 would be diminished. While exact dimensions are not otherwise critical to locking device 16, one skilled in the art knowing the thickness and compressibility characteristics of a particular web selected, could dimension plates 22 and 23 appropriately so that their center sections 24 would never touch in operation under the most extreme tension.

In order to adjust the length of collar 10 by use of slide 14 in a conventional manner, locking device 16 must be caused to partially release its grip on webs 18 and 19, otherwise the pulling on a web normally associated with using slide 14 to adjust its length would only activate device 16 to grip the web and defeat the adjusting process. As shown in FIG. 4, when length adjustment is desired, at least one web 18 or 19 must be relaxed at the area of locking device 16. Thus, by manually forming a loop 32 in web 18, for example, web 18 may be slid through slide 14 to lengthen or shorten collar 10 as desired.

It should thus be appreciated that a pet collar made in accordance with the concepts of the present invention, as discussed herein, substantially improves the adjustable collar art and otherwise accomplishes the objects of the present invention.

We claim:

1. A pet collar comprising a first web portion, a second web portion, and lock means providing a connection between one end of said first web portion and one end of said second web portion, a buckle on the other end of said first web portion, and a free end on the other end of said second web portion, said free end being engageable by said buckle to form a continuous collar, said lock means including a first plate member having a second plate member, each said plate member having a plurality of apertures to receive said first and second web portions and also having barb means to engage said first and second web portions when at least one of said web portions is placed under tension, said barb means of said first plate member being opposed to said barb means of said second plate member to engage said web portions positioned therebetween.

2. A pet collar according to claim 1, each said plate member having a generally planar central section, said central section of said first plate member being opposed to said central section of said second plate member.

3. A pet collar according to claim 2, each said plate member having flanges extending away from said central section, said flanges of said first plate member extending away from said flanges of said second plate member.

4. A pet collar according to claim 3 wherein said barb means of said plate members are carried by each of said flanges, said barb means of said first plate member extending toward said barb means of said second plate member.

5. A pet collar according to claim 1 wherein said apertures are generally oval in configuration thereby having rounded corners to pinch said web portions upon tension.

6. A pet collar according to claim 1, each said plate member having a generally planar central section, one of said apertures being positioned in said central section.

7. A pet collar according to claim 6, each said plate member having a flange extending away from each end of said central section, a second said aperture being positioned in one said flange and a third said aperture being positioned in the other said flange.

8. A pet collar according to claim 7 wherein said second said aperture and said third said aperture also partially extend into said central section.

9. A pet collar according to claim 7 wherein a first bar member separates said aperture in said central section from said second said aperture and a second bar member separates said aperture in said central section from said third said aperture.

10. A pet collar comprising a first web portion; a second web portion; and lock means providing a connection between one end of said first web portion and one end of said second web portion; said lock means including a first plate member and a second plate member; each said plate member having a plurality of apertures to receive said first and second web portions, a generally planar central section, flanges extending away from said central section, and barb means carried by each of said flanges to engage said first and second web portions when at least one of said web portions is placed under a tension; said central section of said first plate member being opposed to said central section of said second plate member, and said flanges of said first plate member extending away from said flanges of said second plate member; said barb means of said first plate member extending toward and being opposed to said barb means of said second plate member; said barb means of said first and second plate members being spaced further from each other than are said central sections to accommodate said web portions therebetween, but upon tension will fully engage said web portions before said central sections can contact each other.

11. A pet collar comprising a first web portion; a second web portion; and lock means providing a connection between one end of said first web portion and one end of said second web portion; said lock means including a first plate member and a second plate member; each said plate member having a generally planar central section and a flange extending away from each end of said central section; a first aperture in said central section, a second aperture in one said flange, and a third aperture in the other said flange; a first bar separating said first aperture from said second aperture and a second bar separating said first aperture from said third aperture; each said plate member also having barb means to engage said first and second web portions when at least one of said web portions is placed under tension, said barb means of said first plate being opposed to said barb means of said second plate; said first web portion extending between said barb means of said first and second plate members, through said second aperture of said second plate member, around said first bar of said second plate member, through said first apertures in said central sections of both said first and second plate members, around said first bar of said first plate member, through said second aperture of said first plate member and between said barb means of said first and second plate members thereby forming a loop, said bar means engaging said web members positioned therebetween.

12. A pet collar according to claim 11 wherein said second web portion extends between said barb means of said first and second plate members, through said third said aperture of second plate member, around said second bar of said second plate member, through said first apertures in said central sections of both said first and second plate members, around said second bar of said first plate member, through said third aperture of said first plate member and between said barb means of said first and second plate members thereby forming a loop.

13. A pet collar according to claim 11 further comprising a buckle on the other end of said first web portion and a free end on the other end of said second web portion, said free end being engageable by said buckle to form a continuous collar.

14. A pet collar according to claim 13 further comprising means on one of said web portions to adjust the length of the collar.

* * * * *

UNITED STATES PATENT AND TRADEMARK OFFICE
CERTIFICATE OF CORRECTION

PATENT NO. : 5,297,514
DATED : March 29, 1994
INVENTOR(S) : Stout et al.

It is certified that error appears in the above-identified patent and that said Letters Patent is hereby corrected as shown below:

Claim 1, column 5, line 1 "having" should read --and--.

Claim 10, column 5, line 55 delete the "a" between the words "under" and "tension"

Claim 11, column 6, line 37 "members" should read --portions--.

Claim 12, column 6, lines 41-42, delete the word "said" from between the words "third" and "aperture"; line 42, add the word "said" between the words "of" and "second".

Signed and Sealed this

Twenty-sixth Day of March, 1996

Attest:

BRUCE LEHMAN

*Attesting Officer*     *Commissioner of Patents and Trademarks*